(12) United States Patent
Buck et al.

(10) Patent No.: US 7,178,776 B2
(45) Date of Patent: Feb. 20, 2007

(54) MOUNTING DEVICE FOR SENSORS

(75) Inventors: Bernd Buck, Nonnenhorn (DE); Franz Sauter, Tettnang (DE); Berthold Schocker, Tettnang (DE)

(73) Assignee: IFM Electronic GmbH, Essen (DE)

( * ) Notice: Subject to any disclaimer, the term of this patent is extended or adjusted under 35 U.S.C. 154(b) by 0 days.

(21) Appl. No.: 10/943,999

(22) Filed: Sep. 20, 2004

(65) Prior Publication Data

US 2005/0029416 A1    Feb. 10, 2005

Related U.S. Application Data

(62) Division of application No. 10/191,756, filed on Jul. 10, 2002, now Pat. No. 6,892,594.

(30) Foreign Application Priority Data

Jul. 10, 2001 (DE) .................... 101 32 768
Sep. 28, 2001 (DE) .................... 101 48 034

(51) Int. Cl.
*A47H 1/10* (2006.01)

(52) U.S. Cl. .................... 248/300; 73/866.5; 174/52.1; 248/316.7

(58) Field of Classification Search ............... 248/200, 248/300, 410, 412, 297.5, 316.1, 316.2, 316.3, 248/316.7; 73/866.5; 174/52.1
See application file for complete search history.

(56) References Cited

U.S. PATENT DOCUMENTS

| | | | |
|---|---|---|---|
| 2,216,886 A * | 10/1940 | Langelier | 248/311.2 |
| 2,629,908 A | 3/1953 | Keck | |
| 2,961,479 A * | 11/1960 | Bertling | 174/43 |
| 3,554,555 A * | 1/1971 | Marci | 473/264 |
| 3,911,638 A * | 10/1975 | Englund et al. | 52/506.08 |
| 3,995,823 A * | 12/1976 | Hensel | 248/327 |
| 4,041,657 A * | 8/1977 | Schuplin | 52/39 |
| 4,305,179 A | 12/1981 | Sakurada | |
| 4,309,120 A * | 1/1982 | Werthmann | 403/18 |
| 4,312,101 A | 1/1982 | Oetiker | |
| 4,425,681 A | 1/1984 | Ilius | |
| 4,425,682 A | 1/1984 | Hashimoto et al. | |
| 4,663,911 A * | 5/1987 | Gracia | 52/506.06 |
| 4,773,129 A | 9/1988 | Muhr | |
| 4,930,192 A | 6/1990 | Muhr | |
| 5,063,274 A * | 11/1991 | Johnson | 174/158 F |
| 5,337,003 A * | 8/1994 | Carmichael et al. | 324/402 |
| 5,354,021 A | 10/1994 | Farrell | |
| 5,482,240 A * | 1/1996 | Caraher | 248/297.51 |
| 5,996,186 A | 12/1999 | Yamada et al. | |
| 6,098,251 A | 8/2000 | Zielinski | |
| 6,592,083 B1 | 7/2003 | Hobson et al. | |

FOREIGN PATENT DOCUMENTS

DE    88 05 837.9 U1    3/1988

(Continued)

*Primary Examiner*—Korie Chan
(74) *Attorney, Agent, or Firm*—David S. Safran

(57) ABSTRACT

A mounting device for contactlessly-operating proximity switches includes a continuous cylindrical or cuboidal recess for holding the proximity switch which is formed by at least two legs. The mounting device can also include at least one through pocket, connected to the recess, into which an actuating tool can fit. The recess of the mounting device, when in a relieved state, has a smaller diameter than the proximity switch which is to be mounted. Additionally, the recess can be spread into an enlarged state by the actuating tool being positioned into the pocket and turned.

5 Claims, 19 Drawing Sheets

FOREIGN PATENT DOCUMENTS

| | | |
|---|---|---|
| DE | 88 05 837.9 | 8/1988 |
| DE | 93 05 896.9 | 7/1993 |
| DE | 93 05 896.9 U1 | 7/1993 |
| DE | 196 41 137 C2 | 4/1998 |
| DE | 196 41 137 C 2 | 7/1998 |
| DE | 298 15 355 U1 | 2/1999 |
| DE | 298 15 355 U1 | 3/1999 |
| DE | 199 00 876 C 1 | 7/2000 |
| EP | 0 650 003 A1 | 4/1995 |

* cited by examiner

MOUNTING DEVICE FOR SENSORS

BACKGROUND OF THE INVENTION

1. Field of the Invention

The invention relates to a mounting device for sensors, especially contactlessly-operating, cylindrical or cuboidal proximity switches, with a cylindrical or cuboidal recess to hold the proximity switch.

2. Description of Related Art

Proximity switches, because of their contactless mode of operation, have continuous almost ideal prerequisites for industrial use. They work without wear, enable high operating frequencies and operating accuracy and are invulnerable to vibrations, dust and moisture. For this reason proximity switches are being used in the millions and have proven their reliability in all areas for decades. Proximity switches are often used as limit switches for control of machinery. Depending on the application, inductive, capacitive, optical or optoelectronic proximity switches can be used as proximity switches.

Some of the proximity switches available in practice have a cylindrical structural shape, the housing of the proximity switch having an outside thread. This proximity switch is mounted by screwing the proximity switch into a corresponding threaded hole. When the proximity switch is adjusted, i.e., it has reached its intended position, it is fixed by means of at least one nut in the threaded hole. If the proximity switch must be replaced due to a defect, the newly inserted proximity switch must be readjusted in a complex manner, for which specialists are necessary, which in turn leads to significant downtime of the machine controlled by such a proximity switch.

To solve this problem, the use is known of a stop sleeve into which a proximity switch of conventional design is inserted. Readjustment is no longer necessary when the proximity switch is changed due to the fixed stop made on the stop sleeve. One such mounting device is known, for example, from German Utility Model DE 88 05 837. In this mounting device, the proximity switch is inserted into a receiving sleeve which is provided with an outside thread and is attached by means of a union nut.

German Patent DE 196 41 137 discloses a stop sleeve into which the proximity switch is inserted, the stop sleeve having a slotted end area into which an annular fixing element insert, having crosspieces that extend in the axial direction, can be inserted. By moving this fixing element into the slotted area of the stop sleeve the crosspieces are pressed to the inside, and the proximity switch is secured.

In addition, clamp-like holders for mounting of cylindrical proximity switches are known. These clamp-like holders have two separate clips which are drawn together by means of screws, after inserting the proximity switch, which thus fixes the proximity switch.

The known approaches for proximity switches which require the use of a stop sleeve have the principal disadvantage that they are suitable only for fixing cylindrical proximity switches. In addition, production of stop sleeves, having an outside thread and preferably having only a very small wall thickness while nevertheless being of high strength, is relatively complex and thus expensive.

It is common to all approaches that the final fixing of the proximity switch takes place by means of screws or union nuts so that the mounting device has several parts which can be lost, and requires the use of tools for fixing the proximity switch in position so that the replacement of a proximity switch is time-consuming. In addition, secure fixing of the proximity switch in no small degree depends on the screws or the union nuts being carefully tightened by the installer.

German Patent DE 199 00 876 discloses a mounting device for proximity switches which has a base body which in its top has a pivotally mounted fixing body with a clamp element.

Fixing of a proximity switch that has been inserted into the recess of the base body takes place by swiveling the fixing body which secures the proximity switch by way of the clamp element. With this mounting device, the fixing of the proximity switch without a tool is possible, however, the mounting device is relatively complex to produce due to the required swiveling support of the fixing body.

SUMMARY OF THE INVENTION

A primary object of this invention is to provide a mounting device for cylindrical and cuboidal proximity switches which enables quick and simple replacement of the proximity switch and has a simple construction.

The mounting device of the invention is characterized by a first embodiment in which the mounting device has at least one through-pocket into which an actuating means can fit, has a recess where the pocket or pockets are connected to one another such that the recess, in the relieved state of the mounting device, has a smaller diameter or smaller dimensions than the proximity switch to be mounted. The recess can be spread by the actuating means fitting into the pocket.

According to a second embodiment of the invention, the aforementioned object is achieved by a mounting device having two spring legs and two clamp ends, the spring legs passing into the clamp ends and in the relieved state of the mounting device the recess having a smaller diameter or smaller dimensions than the proximity switch which is to be mounted. The recess can be spread by pressing together the clamp ends or the spring legs can be spread apart by pressing the clamp ends together.

According to a third embodiment of the invention, a mounting device is disclosed which has at least two legs which are elastically connected to one another, in each leg a cylindrical or cuboidal recess is formed which is capable of holding the proximity switch. In a first state of the mounting device, the sensor is held in the mounting device such that the legs are aligned at an acute angle to one another. While in the second state of the mounting device, in which the sensor can be inserted into the mounting device or removed from it, the legs are aligned to one another at a smaller angle, i.e., essentially parallel, and the legs can be shifted from the first state into the second state against the spring force of the mounting device.

In the mounting device of the invention, neither a separately fabricated fixing body nor screws are necessary for attachment of the proximity switch. The proximity switch is fixed simply by clamping the proximity switch in the recess of the mounting device. In the mounting device according to the first two alternatives of the invention, during spreading the recess by an actuating means or by hand and for subsequent clamping of the proximity switch, the spring properties of the mounting device will be used. The mounting device is thus suited for proximity switches with and without an outside thread; while the mounting device is intended, preferably, for cylindrical proximity switches, but the mounting device of the invention can also be used for cuboidal proximity switches with a structuring of the recess.

In the first embodiment of the invention, a recess and a pocket in the mounting device are formed so that the recess and the pocket are connected to one another and legs that are elastic within certain limits are formed. In the mounting device according to the second embodiment of the invention, the recess is formed by two spring legs which are constructed such that the recess, when in the relieved state, has a smaller diameter or smaller dimensions that the proximity switch which is to be attached.

The recess can be spread by hand, or if necessary, spread using an actuating means or a tool. The proximity switch when inside the spread state of the recess of the mounting device is freely movable and thus easily adjustable. The proximity switch can be fixed by simple re-actuation, i.e., locked, such that secure fixing of the switch is always ensured regardless of the care taken by the installer. The proximity switch is fixed simply via the spring force of the mounting device, that is, as soon as the actuating means is removed from the recess or the clamp ends are released.

In the mounting device according to the third embodiment of the invention, the proximity switch is similarly fixed by clamping the proximity switch in the recesses which formed in the two legs. But clamping takes place, not by spreading the recesses, but by changing the location of the recesses relative to the lengthwise axis of the proximity switch to be mounted. The change in the location of the recesses is thus automatically caused by the spring action of the mounting device as soon as the two legs are no longer held against the spring force of the mounting device in the second state.

According to one advantageous embodiment of the invention, the mounting device has a base part in which there is at least one hole, preferably two or four holes. The base part which can be made for example as a base plate is used to fix the mounting device on a vessel wall or the side wall of a machine.

In the specific configuration of the mounting device according to the first embodiment of the invention there are a number of variations, some of which will be detailed by way of example. Basically, there are several options available for the mounting device such as placing the pocket between the base part and the recess or placing the recess between the base part and the pocket. The arrangement of the recess and the pocket can thus be changed relative to the base part depending on the particular construction of the actuating device.

In particular, when the pocket is located between the base part and the recess, according to one preferred embodiment of the invention, another opening is formed between the base part and the pocket. This opening makes it possible to adjust the clamping force of the mounting device and the force which is necessary to spread the recess. The force which is necessary for spreading the recess using the actuating means can be further reduced by the recess or the pocket being open on one side. Additionally, the pocket can be located as far as possible from the recess in order to be able to use a lever arm which is as large as possible.

According to another embodiment of the invention, the recess on the face has a stop. Using this stop, readjustment is no longer necessary when the proximity switch is replaced. Depending on the material used for the mounting device and depending on what type of proximity switch is used, the stop can be made solid or annular.

According to an advantageous approach to the second embodiment of the invention, the clamp ends are made such that they overlap one another and project roughly vertically from spring legs such that one spring leg, in the transition area to its clamp end, has an elongated recess for holding the correspondingly narrower other clamp end.

In the specific embodiment of the mounting device according to the second embodiment of the invention, there are also a host of variations some of which will be detailed by way of example together with the drawings. The individual mounting devices differ especially by the execution of the spring legs and the clamp ends. The spring legs can be made essentially symmetrical to one another so that each spring leg is made roughly hemispherical. But likewise one spring leg can also have a larger arc periphery or the two spring legs can pass entirely into one another so that functionally there are only two spring legs.

Just as in the mounting device according to the first embodiment, in the mounting device of the second embodiment has a recess that can be made open on one side. In this case, the two spring legs, which together form the recess, do not yield a solid circular periphery, but surround the inserted proximity switch like pincers. The advantage of the recess open on one side is that the force needed to spread the recess, i.e. to press the spring legs apart, is reduced.

In the mounting device of the third embodiment of the invention, a spine is positioned between the two legs which connects the legs so that the mounting device is made in roughly a U-shape. The spine can then be used to fix the mounting device on the wall of a vessel or housing, for which the spine has at least one hole, and preferably two or four holes. By the corresponding choice of the length of the spine, a mounting device can also be formed which is optimally matched to the correspondingly length of the proximity switch to be mounted.

In an alternative approach of the mounting device of the third embodiment of the invention, the two legs are directly joined to one another so that the mounting device is made roughly V-shaped. In order to be able to fix such a mounting device on the wall of a vessel or housing, a mounting leg, angled at roughly 90°, is mounted on the end of a leg. In this mounting leg several corresponding holes are provided for fixing the mounting device.

The mounting device of the invention is fabricated one piece so that individual parts cannot be lost when the proximity switch is fixed. Preferably, the mounting device is made not only one-piece, but also integral. The one-piece fabrication of the mounting device is defined within the framework of the invention as a mounting device which cannot be easily broken down in several parts. The integral mounting device is defined as a mounting device which in fact is composed of only one part which cannot easily be broken down into several part, as is possible in the one-piece mounting device, i.e., welded together from two pieces. The integral formation of the mounting device makes it possible to produce it easily and economically.

In particular, there are a host of possibilities for embodying and developing the mounting device of the invention. To more fully appreciate the various embodiments of the invention reference is made to the description of preferred embodiments in conjunction with the drawings.

DETAILED DESCRIPTION OF THE INVENTION

Figure 1:
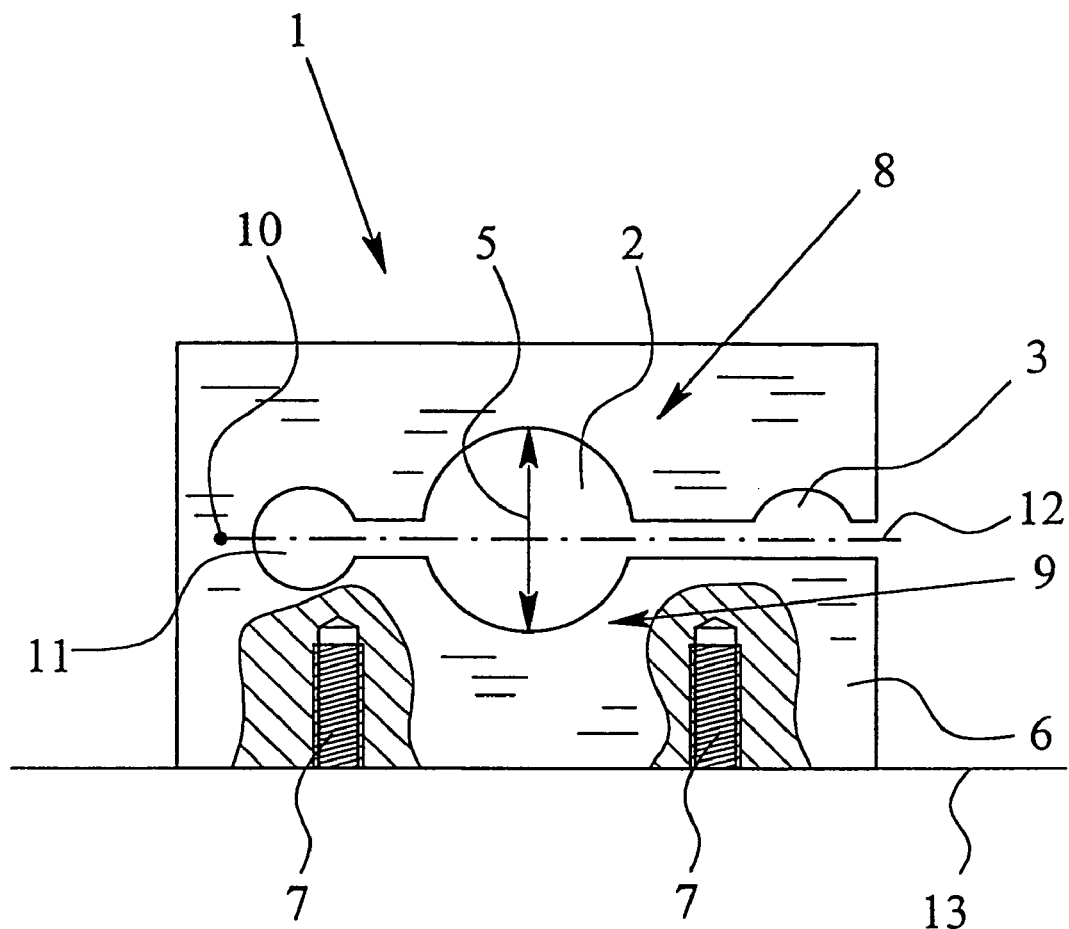
FIG. 1 shows a first embodiment of the mounting device according to the invention.

The mounting devices 1 shown in FIGS. 1 to 8 and 10 to 18 are used to hold and fix a cylindrical proximity switch 26, shown only in FIGS. 14 to 18, for which the mounting devices 1 each have a through cylindrical recess 2. If, instead of cylindrical proximity switches 26, cuboidal proximity switches are to be fixed using the mounting device, the mounting device would have a cuboidal recess 2 instead of a cylindrical recess 2.

The mounting devices 1 shown in FIGS. 1 to 8 according to the first embodiment of the invention have in addition to the recess 2 one pocket 3 which is connected to the recess 2. The pocket 3 is used to hold the actuation means 4 which is shown in FIG. 9 and using which the recess 2 can be spread. The recess 2 in the relieved state of the mounting device 1 has a diameter 5 which is somewhat smaller than the outside diameter of the proximity switch which is to be mounted. In this way, the proximity switch, when it is inserted into the recess 2, is clamped by the mounting device 1 and is thus fixed in the given position.

All the mounting devices 1 shown in FIGS. 1 to 8 and 10 to 18 have a base part 6 in which there is at least one hole 7. The base part 6 and the hole 7 or holes 7 are used for mounting of the mounting device 1, for example, on the container wall or the side wall of a machine.

For the mounting device 1, the proximity switch is always fixed by clamping it in the recess 2. Preferably, the mounting device 1 is made integral, but it can also be made in one piece, according to the embodiments as shown in FIGS. 2a, 2b, 4, 10, and 11. The one-piece mounting or integral device 1, especially the recess 2, is divided functionally into two shell halves 8, 9 by the formation of the recess 2 and the pocket 3 which are connected to one another as shown in FIGS. 1 to 8. Thus, by inserting the actuating means 4 into the pocket 3 the recess 2 can be spread by pressing the two shell halves 8, 9 apart. Depending on the formation of the recess 2 and the pocket 3, and on how the recess 2 and the pocket 3 are arranged relative to one another and the base part 6, the location of the functional axis 10 of rotation around which the two shell halves 8, 9 are pressed apart is different.

Figure 2A:
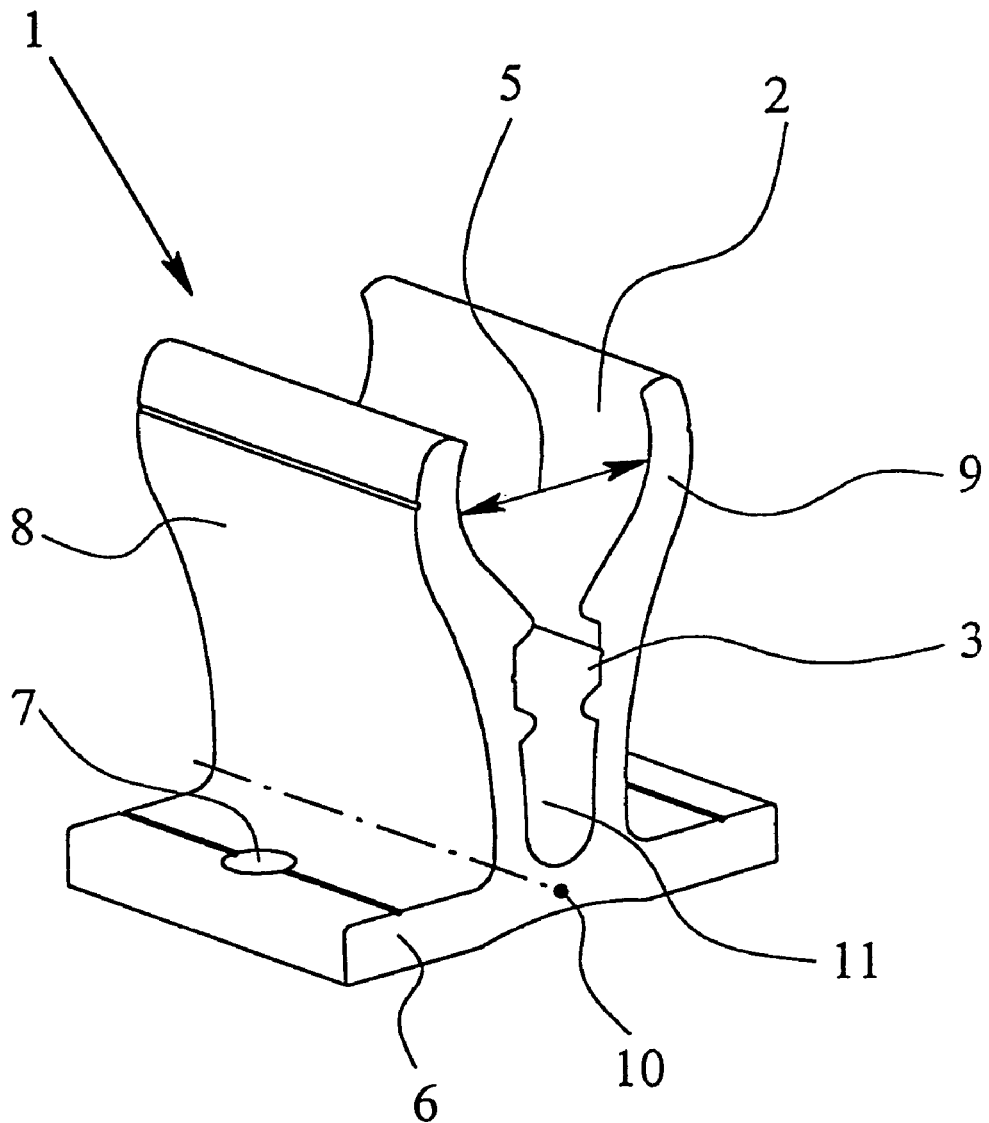
FIGS. 2a & 2b are perspective views of two variations of the first embodiment of a mounting device according to the invention, i.e., as a one-piece variation and as an integral embodiment, respectively.
Figure 2B:
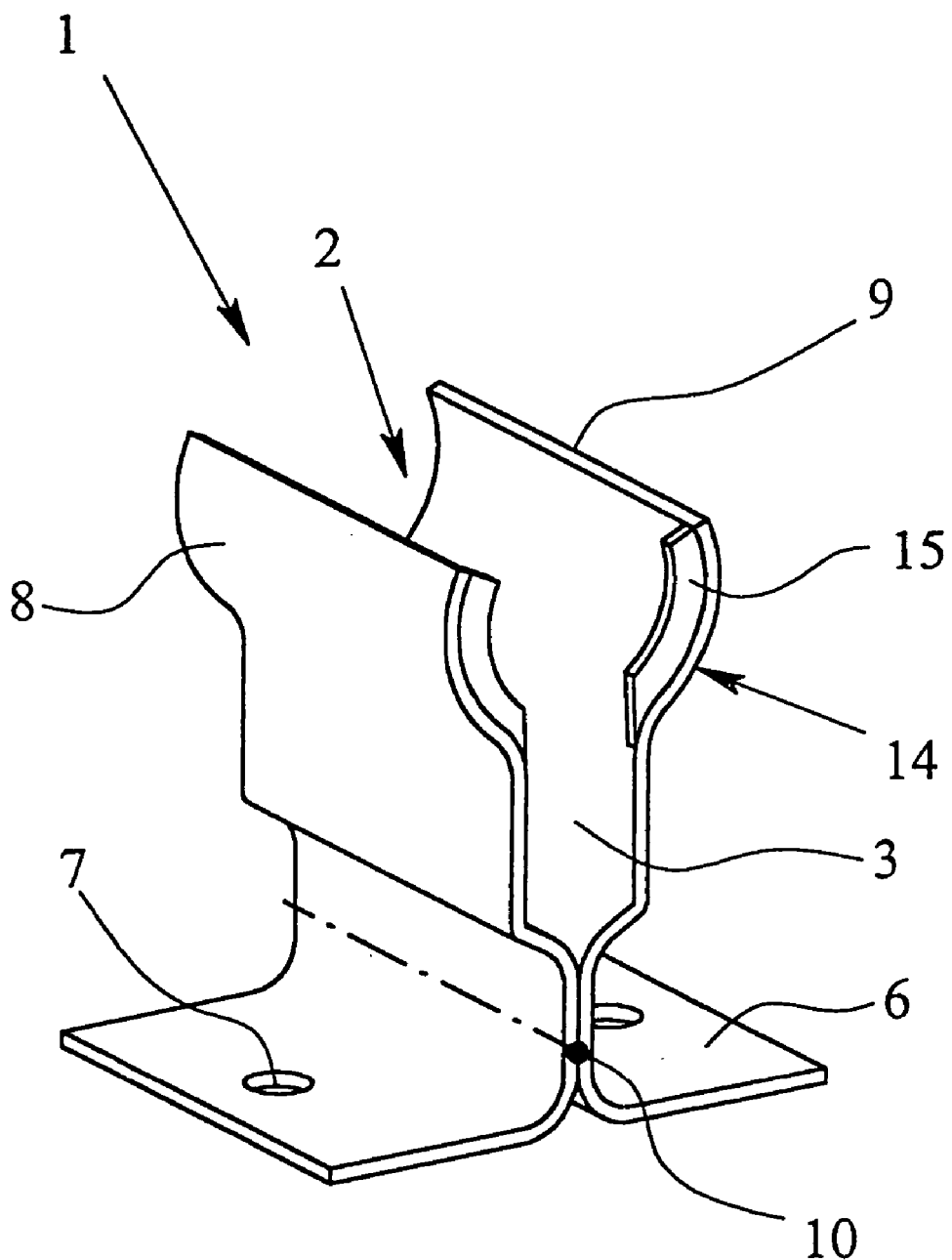
Figure 3:
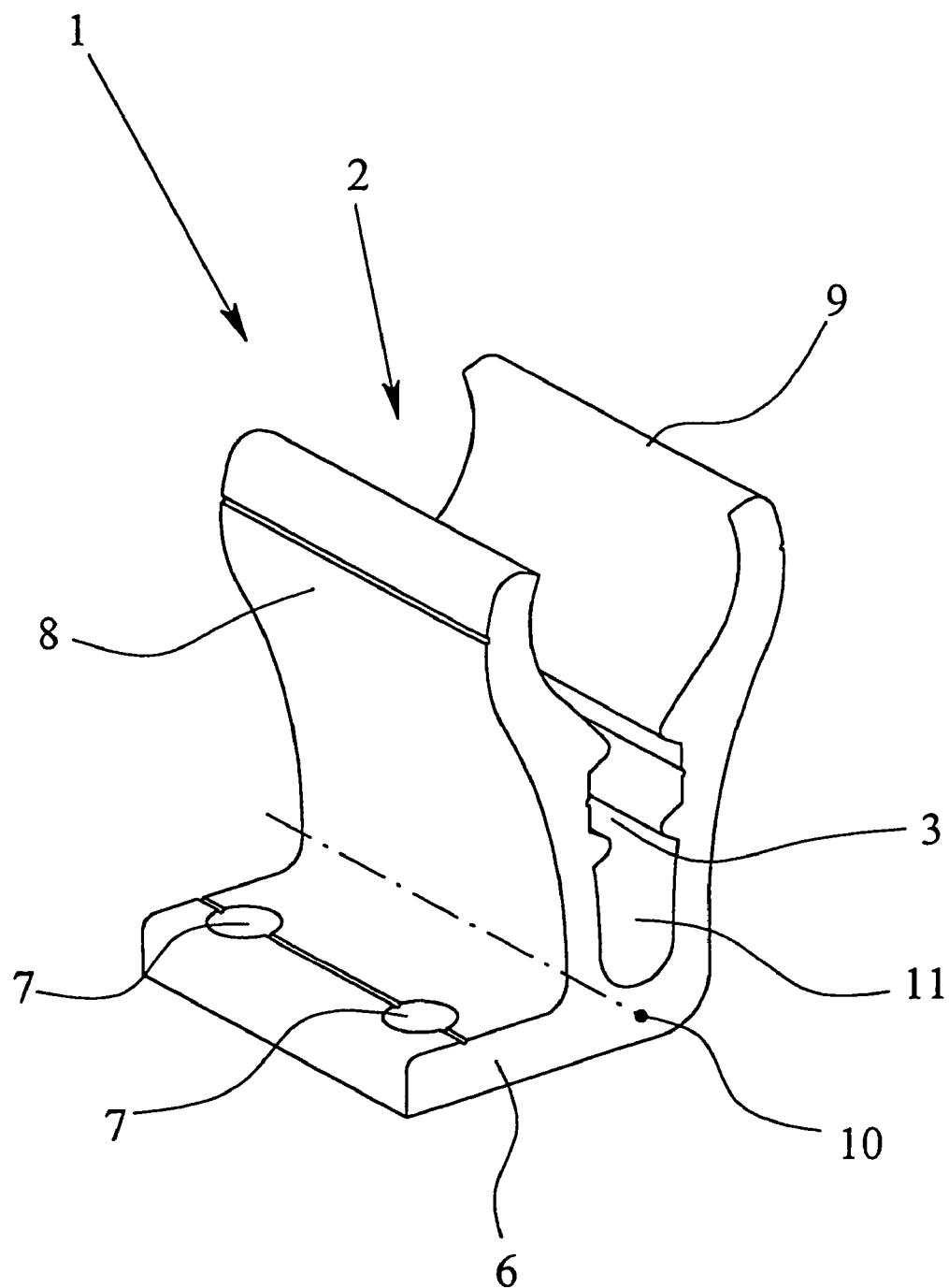
FIG. 3 is a perspective view of another variation of the mounting device which is similar to the embodiment as shown in FIG. 2a, FIG. 4 is a perspective view of yet another variation of the mounting device according to the first embodiment of the invention.
Figure 6:
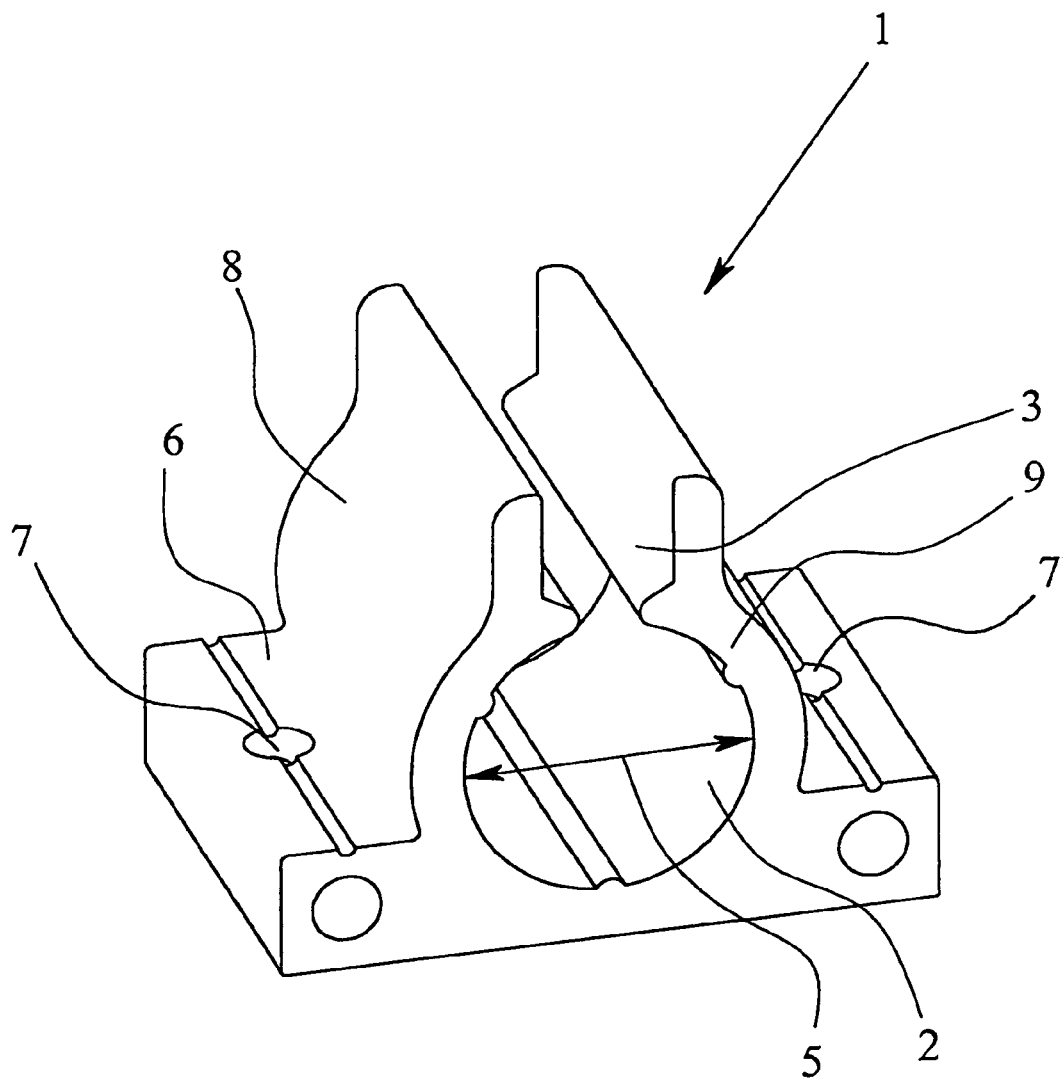
FIG. 6 is a perspective view of another variation of a mounting device according to the first embodiment of the invention.
Figure 7:
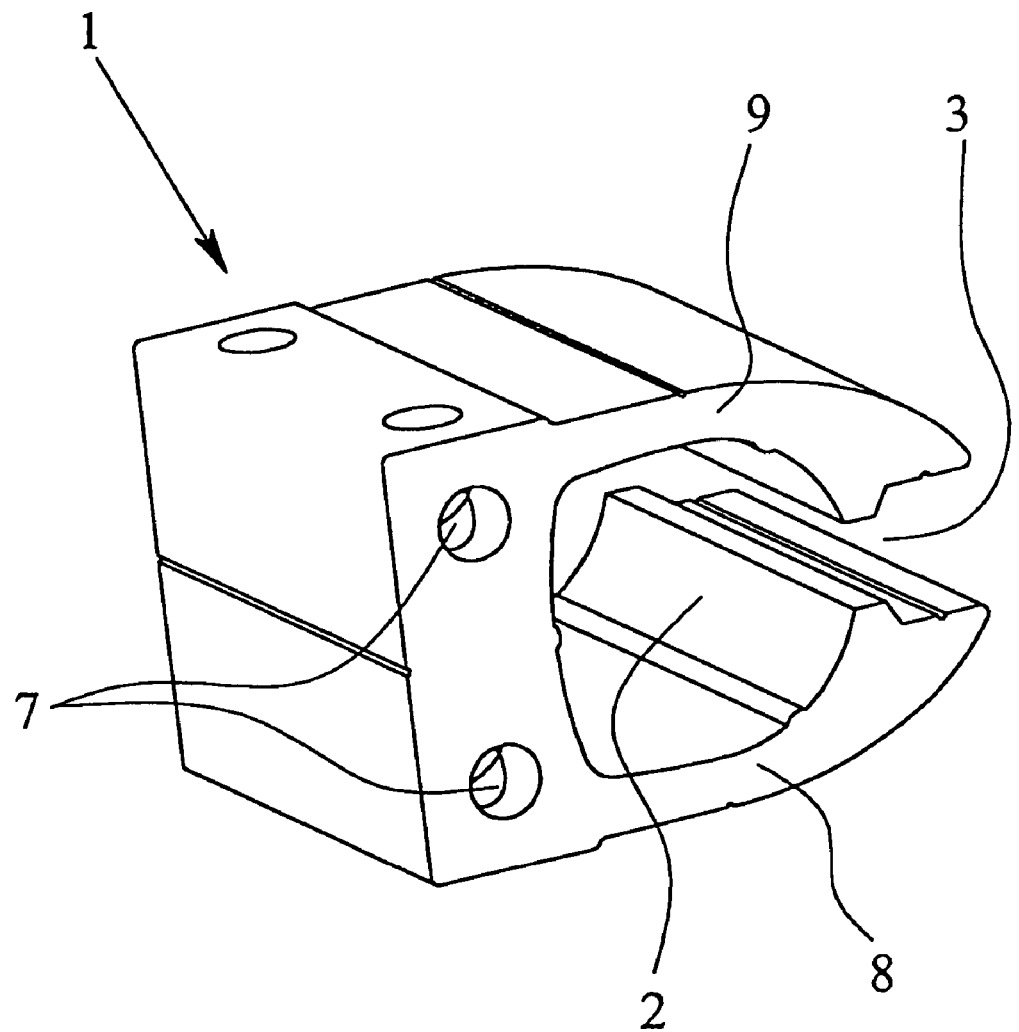
FIG. 7 is a perspective view of a further variation of the mounting device according to the first embodiment of the invention.

In the mounting devices 1 shown in FIGS. 2a to 5, the pocket 3 is located between the base part 6 and the recess 2 in the mounting device 1. Conversely, in the embodiments as shown in FIGS. 6 and 7, the recess 2 is located between the base part 6 and the pocket 3. This results first of all in a difference with respect to the possibility of inserting the proximity switch into the recess 2. In the embodiments as shown in FIGS. 6 and 7, in which the recess 2 is located between the base part 6 and the pocket 3, as in the embodiments shown in FIGS. 1 and 8, the proximity switch can be pushed into the recess 2 only in the lengthwise direction of the proximity switch or in the lengthwise direction of the mounting device 1. Conversely, when the pocket 3 is located between the recess 2 and the base part 6, it is possible to insert a proximity switch into the recess 2 in a transverse direction relative to the lengthwise direction. Of course, this is only possible when the recess 2 is open on one side, as shown in FIGS. 2 and 3, so that the proximity switch in the spread state of the recess 2 can be inserted into the mounting device 1 from above the recess 2. The enclosure angle of the recess 2 which is open on one side is preferably between 180° and 230° degrees.

In the embodiments as shown in FIGS. 1, 2a and 3, the mounting device 1 has another opening 11. Using this additional opening 11, both the clamping force of the mounting device 1 or the recess 2 as well as the force which is necessary for spreading the recess 2 can be adjusted or reduced. The opening 11, depending on the arrangement, is connected to the recess 2 (FIG. 1) or to the pocket 3 (FIG. 2a and FIG. 3). The required expenditure of force for spreading the recess 2 when the actuating means 4 is inserted into the pocket 3 is reduced by the placement of the additional opening 11, shown in FIG. 1 as a hole. This can also be done functionally by the pocket 3 being enlarged. In particular, a comparison of the embodiment as shown in FIGS. 2a and 2b shows that the separate formation of the pocket 3 and opening 11, which is shown in FIG. 2a, can also be implemented by an enlarged pocket 3, shown in FIG. 2b, in which the additional opening 11 has been integrated.

Figure 8:
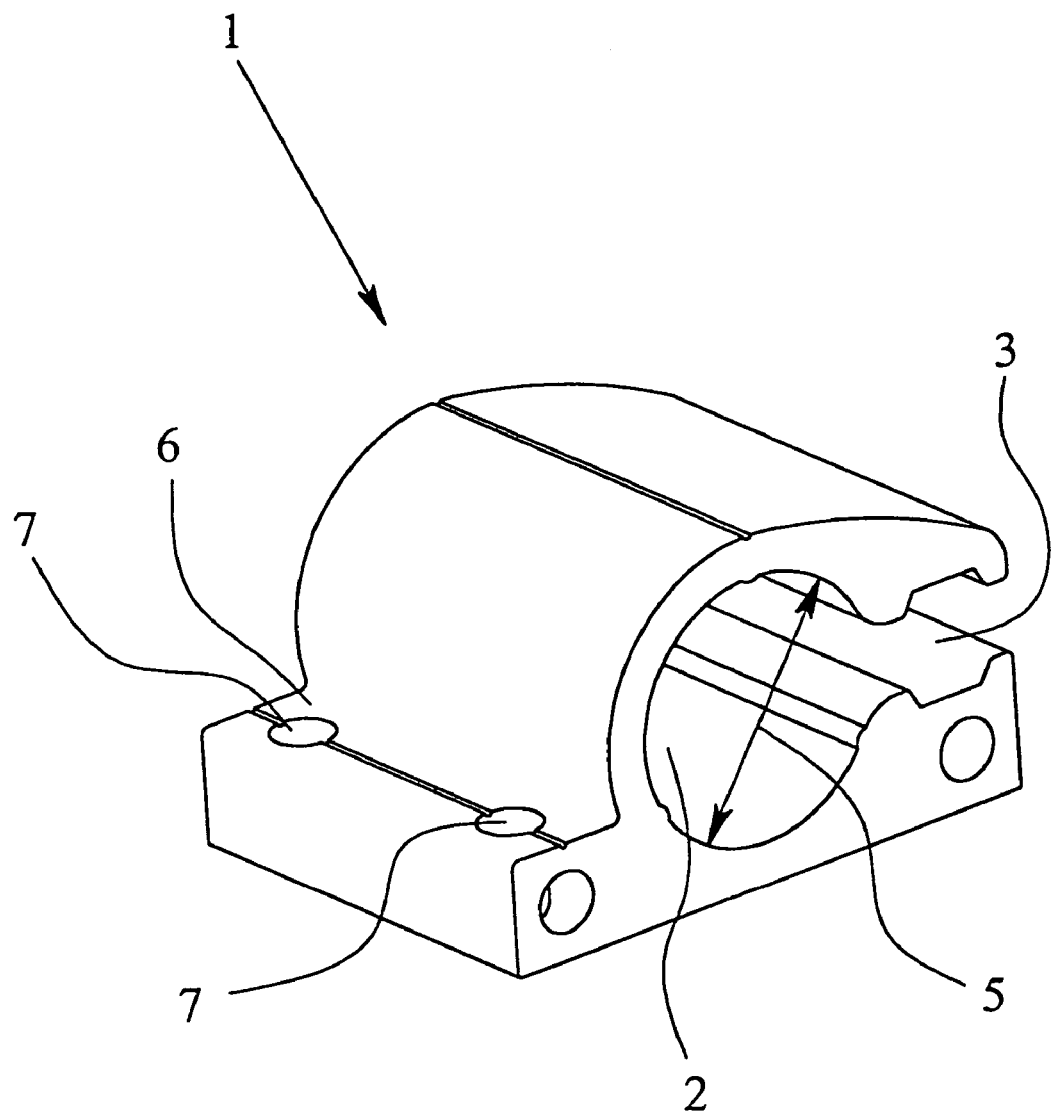
FIG. 8 is a perspective view of a variation of the mounting device according to the second version.
Figure 9:
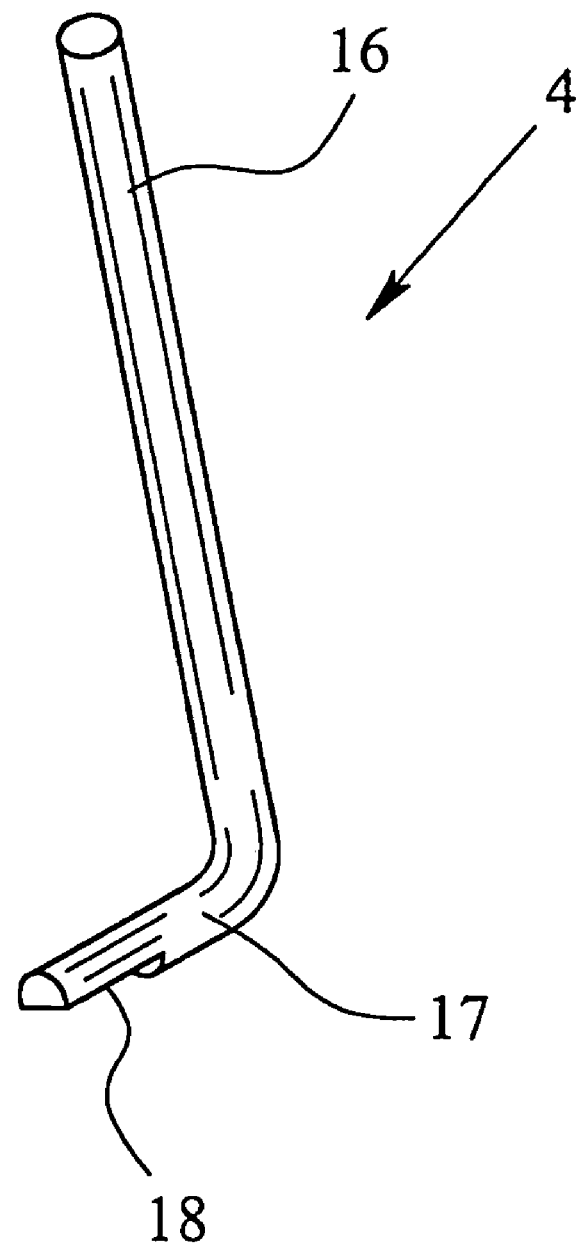
FIG. 9 shows an embodiment of the actuating means for fitting into the mounting device according to the first embodiment of the invention.

While FIGS. 2a to 7 each show a mounting devices 1 in which the slot plane 12 formed by the arrangement of the recess 2, the pocket 3 and the additional opening 11 runs perpendicular to the mounting plane 13, FIGS. 1 and 8 each show a mounting devices in which the slot plane 12 runs parallel to the mounting plane 13.

FIG. 2b shows a mounting device 1 in which a stop 15 is formed on a face 14 of the recess 2. Instead of the annular stop 15 shown here, a disk-shaped, i.e, solid, stop, is possible which is composed of a material which does not influence the proximity switch to be mounted. Upon using such a stop 15, the replaced adjustment of a proximity switch is no longer necessary. The proximity switch is inserted into the recess 2 as far as the stop 15, by which it is ensured that the proximity switch assumes it required position.

Figure 4:
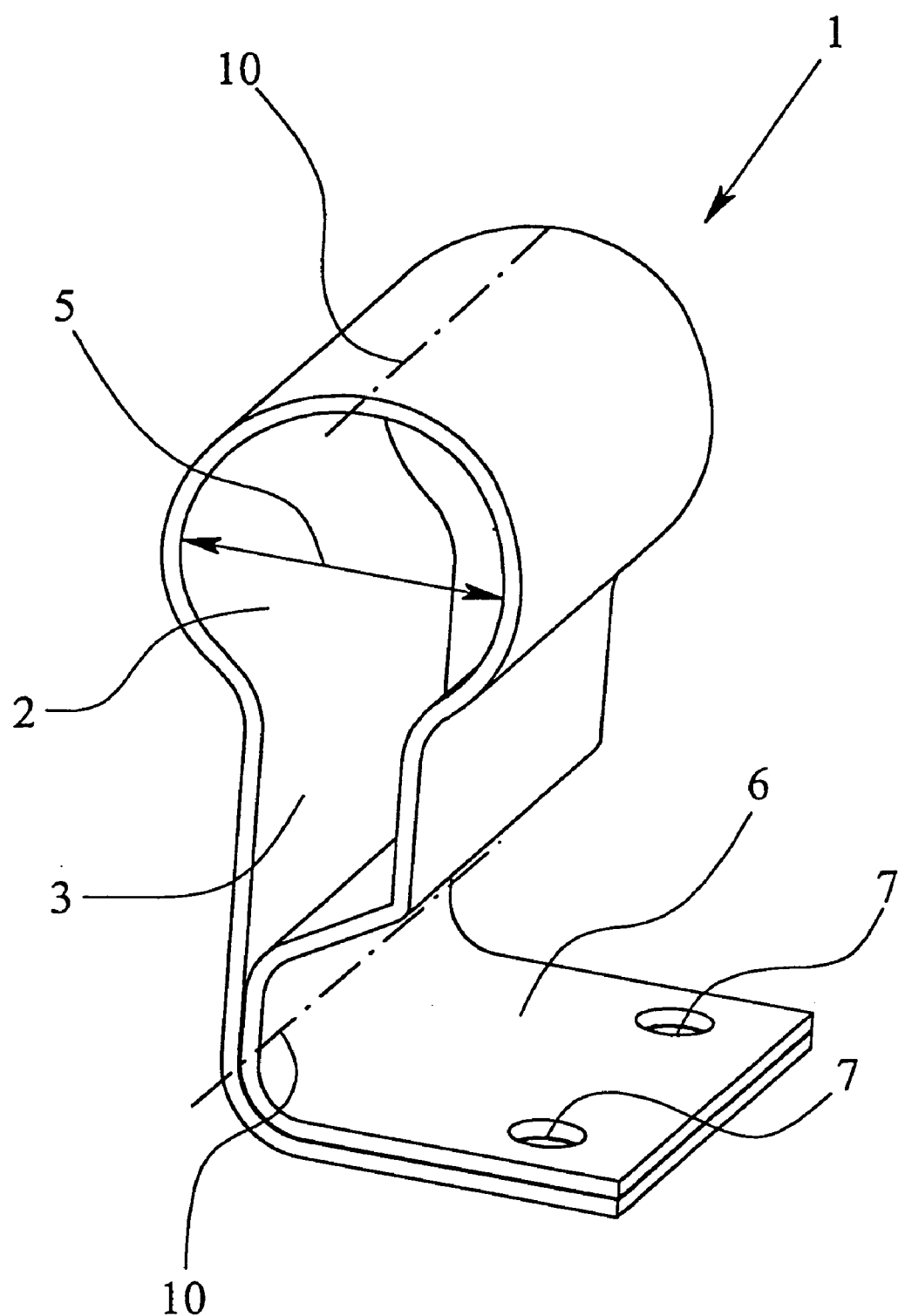
Figure 5:
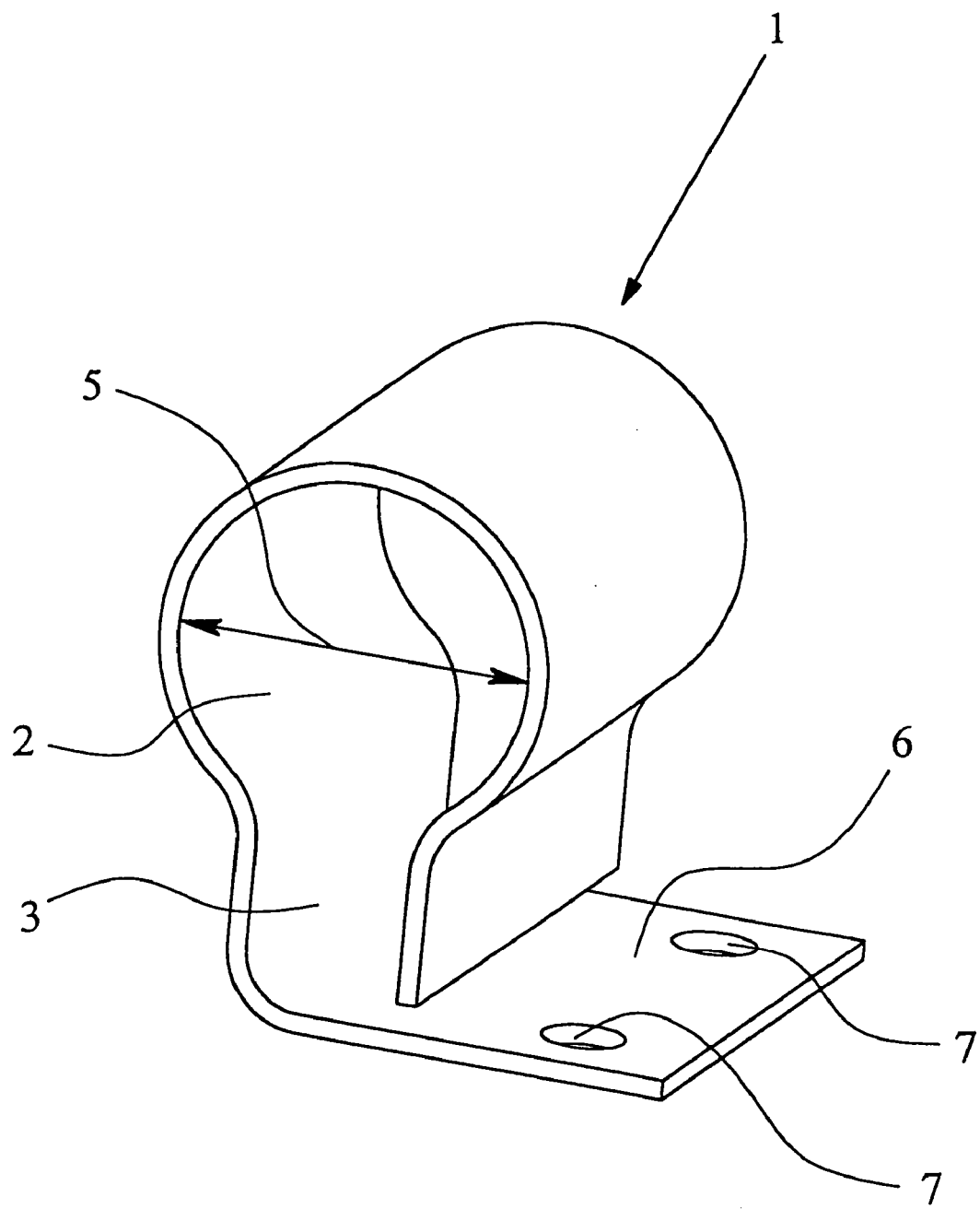
FIG. 5 is a perspective view of still another variation of the mounting device according to the first embodiment of the invention.

In the embodiment shown in FIG. 4, the recess 2 is not made open on one side, so that the proximity switch cannot be inserted into the recess 2 from above. Due to the overall closed construction of this mounting device 1—in the mounting device 1 shown in FIG. 5 the pocket 3 is made open on one side—the mounting device 1 has not only one, but two axes 10 of rotation. A closed execution can be advantageous especially in integral mounting devices 1 composed of two metal sheets or in mounting devices 1 of plastic.

FIG. 9 shows one preferred embodiment of the actuating means 4 for insertion into the pocket 3 of a mounting device 1 according to the first embodiment of the invention. The actuating means 4 has a handle section 16 and a wrench section which runs essentially perpendicular thereto. To spread the recess 2 of the mounting device 1, as shown in FIG. 1, the wrench section 17 of the actuating means 4 is inserted into the recess 2 and then turned around the swiveling axis which runs perpendicular to the plane of the drawing. This rotary motion can be carried out with only little expenditure of force due to the essentially right-angled execution of the actuating means 4. The wrench section 17 of the actuating means 4 has a flattened area 18 so that the actuating means 4 or the wrench section 17 has a surface which is eccentric relative to the swiveling axis. Corresponding thereto, the pocket 3 of the mounting device 1 shown in FIG. 1 has a non-circular cross section. Instead of the specially made actuating means 4 shown in FIG. 9, a commercial square or hexagonal tool can be used, e.g., a conventional Allen wrench. The actuating means 4 and the pocket 3 are dimensioned such that when the pocket 3 is spread the mounting device 1 is deformed only in the elastic area.

FIGS. 10 to 13*b* show four different embodiments of a mounting device 1 according to the second embodiment of the invention.

Like all the mounting devices 1 shown in the FIGS. 1–9, the mounting devices 1 of FIGS. 10 to 13*b* also have a recess 2 for holding the proximity switch 26. Further, as in the mounting device 1 according to the first embodiment of the invention, in the mounting devices shown in FIGS. 10 to 13*b*, fixing of the proximity switch 26 takes place by clamping it in the recess 2. To clamp the proximity switch 26 in the recess 2, the mounting device 1 has two spring legs 20 which are made such that the recess 2 in the relieved state of the mounting device 1, i.e., in the relieved state of the spring legs 19, 20, has a smaller diameter 5 than the proximity switch 26 to be mounted. To mount the proximity switch 26, the recess 2 is widened by forming the ends of the spring legs 19, 20 to have clamp end 21, 22, so that spreading of the recess 2 can be done simply by pressing the clamp ends 21, 22 together. The clamp ends can be pressed together using a tool, e.g., pincer pliers.

Figure 10:
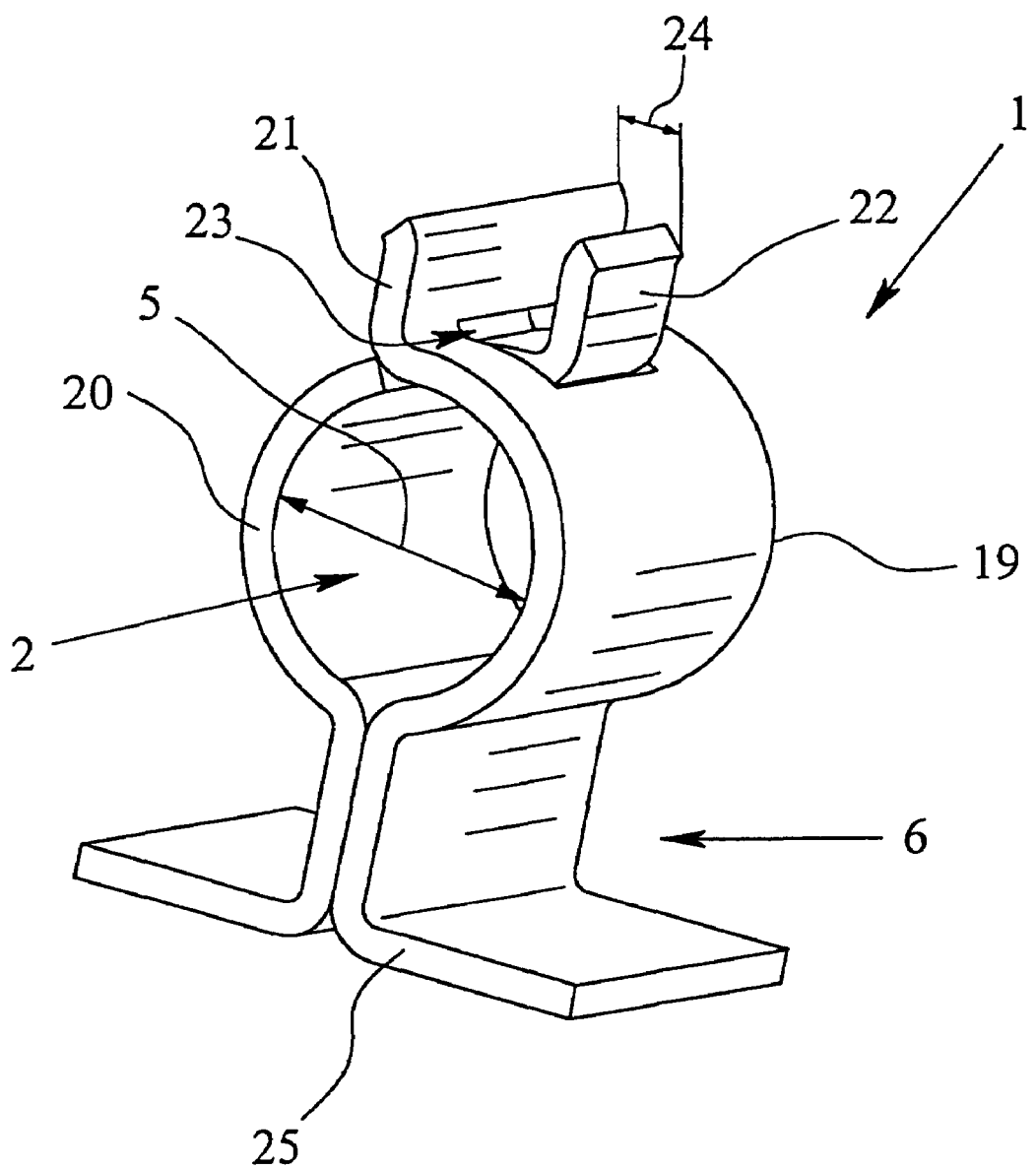
FIG. 10 shows a first variation of the mounting device according to a second embodiment of the invention.
Figure 11:
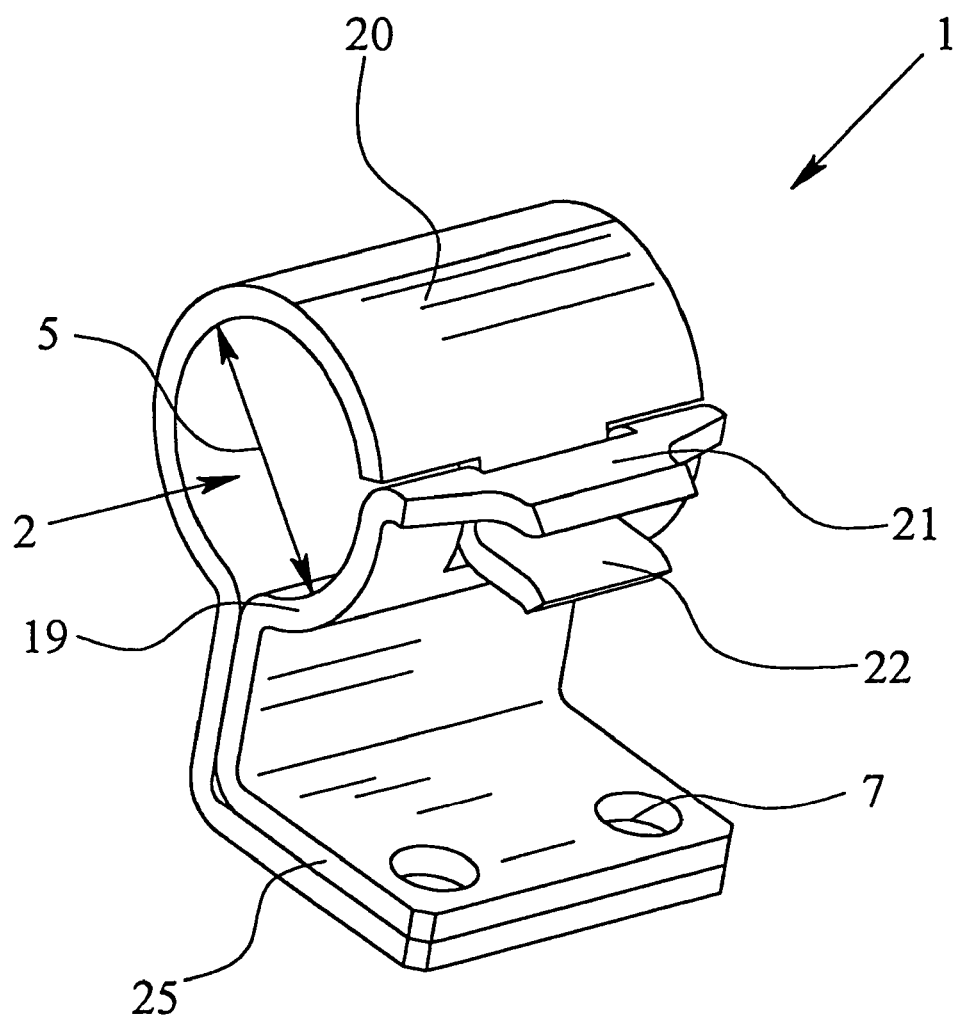
FIG. 11 shows a second variation of the mounting device according to the second embodiment of the invention.
Figure 12:
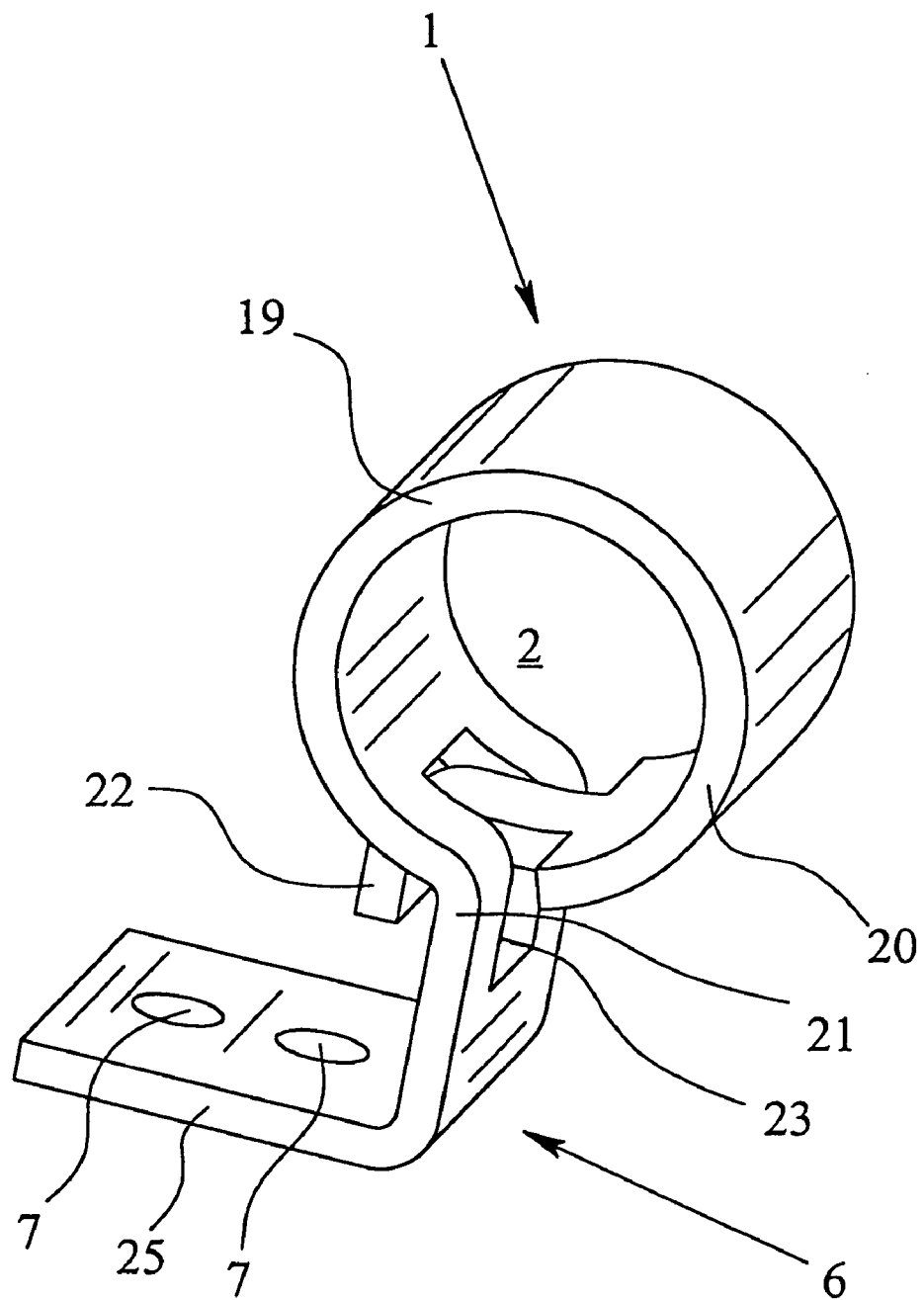
FIG. 12 shows a third variation of the mounting device according to the second embodiment of the invention.

In the mounting devices 1 shown in FIGS. 10 to 12, the two clamp ends 21, 22 project roughly vertically from the spring legs 19, 20 and either the clamp ends 21, 22 or the ends of the spring legs 19, 20 are made overlapping one another. In order to do this, one spring leg 19, in the transition area to its clamp end 21, has an elongated recess 23 formed for holding the correspondingly narrower other clamp end 22.

With this specific configuration of the clamp ends 21, 22 and overlapping area of the two spring legs 19, 20, the distance 24 between the two clamp ends 21, 22 in the relieved state of the spring legs 19, 20 can be fixed, while, the ability of the diameter 5 of the recess 2 to expand beyond the elastic limit when the clamp ends 21, 22 are pressed together can be prevented. It is apparent from FIGS. 10 and 11 that a maximum spreading state is reached when the two clamp ends 21, 22 adjoin one another with their backs. In this way, reliable protection of the spring legs 19, 20 against over-stretching is accomplished.

The mounting devices 1 shown in FIGS. 10 to 13*b*, in addition to the recess 2 formed by the spring legs 19, 20, have a base part 6 in which, depending on the application, holes 7 are formed for fixing the mounting device 1 on the housing wall or the side wall of a machine. Depending on the execution and arrangement of the clamp ends 21, 22 relative to the base part 6, the mounting device 1 overall has a roughly Ω shaped outline (FIG. 10) or a roughly ρ shaped outline (FIG. 12).

The two mounting devices 1, as shown in FIGS. 10 and 11, differ by the manner of alignment of the clamp ends 21, 22 relative to the foot 25 of the base part 6. In addition, the two mounting devices 1 also differ by the formation of the two spring legs 19, 20. While in the mounting device shown in FIG. 10 the two spring legs 19, 20 are made symmetrical to one another, i.e., each spring leg 19, 20 is thus made roughly semicircular, in the mounting devices 1 as shown in FIG. 11 the spring leg 19 has simply a quadrant outline, while the spring leg 20 has a triple quadrant outline.

The mounting device 1 as shown in FIG. 12, in contrast to the two mounting devices 1 shown in FIGS. 10 and 11, is made integral such that the two spring legs 19, 20 pass into one another and can be distinguished only functionally. In this mounting device 1, the clamp end 21 is made such that it is formed integrally with base part 6.

Figure 13A:
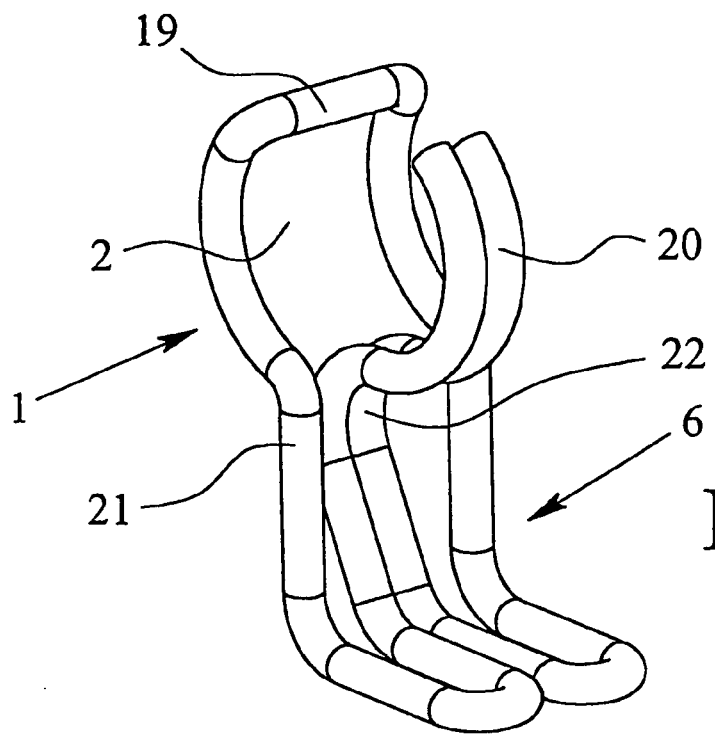
FIGS. 13a and 13b show two other variations of the mounting device according to the second embodiment of the invention.
Figure 13B:
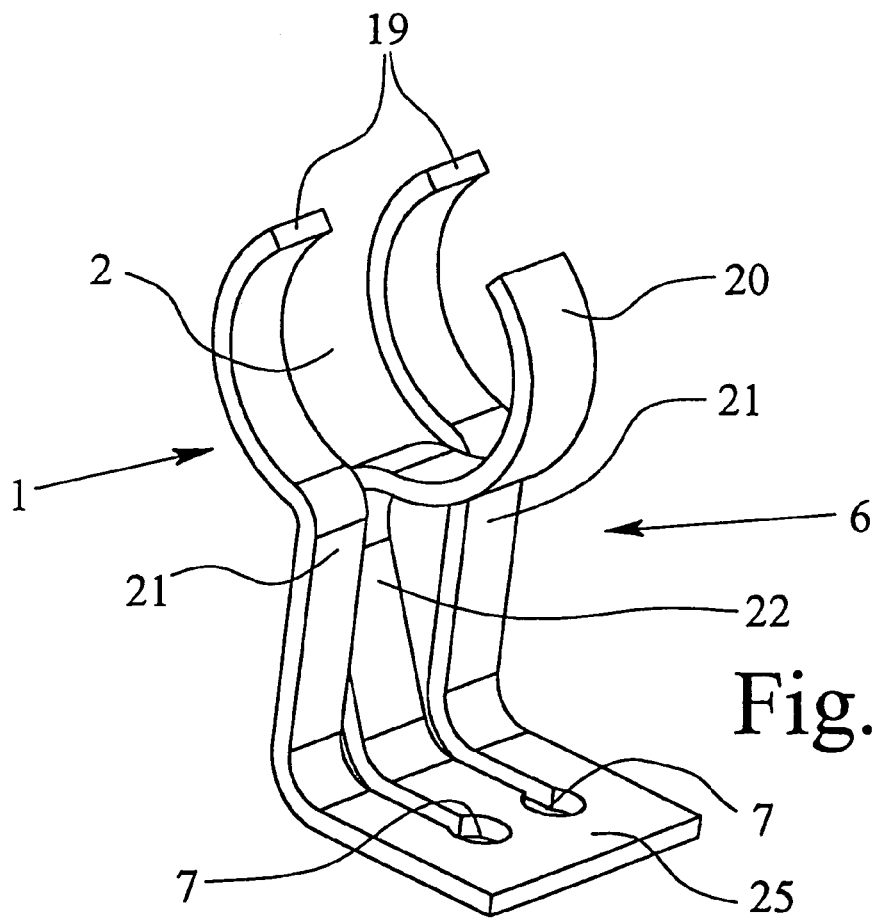

Just as in the mounting device 1 as shown in FIG. 2*b*, in the mounting devices 1 shown in FIGS. 10 to 12 have formed on the face of the recess 2 a stop for positioning of the proximity switch 26. Direct passage of the clamp ends 21, 22 into the base part 6, according to the mounting device as shown in FIG. 12, is also implemented in the mounting device 1 as shown in FIGS. 13*a* and 13*b*. The mounting devices 1 shown in FIGS. 13*a* and 13*b*, moreover, have the particularity that the recess 2 is open on one side, specifically in a direction opposite from the base part 6. Finally, the mounting devices 1 shown in FIGS. 13*a* and 13*b* differ from the mounting devices 1 shown in FIGS. 10 to 12 in that the two spring legs 19, 20 each have a different width.

The two mounting devices 1 as shown in FIGS. 13*a* and 13*b* differ from one another in that the mounting device 1 as shown in FIG. 13*a* is shaped from a wire, while the mounting device 1 as shown in FIG. 13*b* is first punched out of sheet metal and then bent into final form.

FIGS. 14*a* to 17 show four different versions of a mounting device 1 according to the third embodiment of the invention.

Figure 14A:
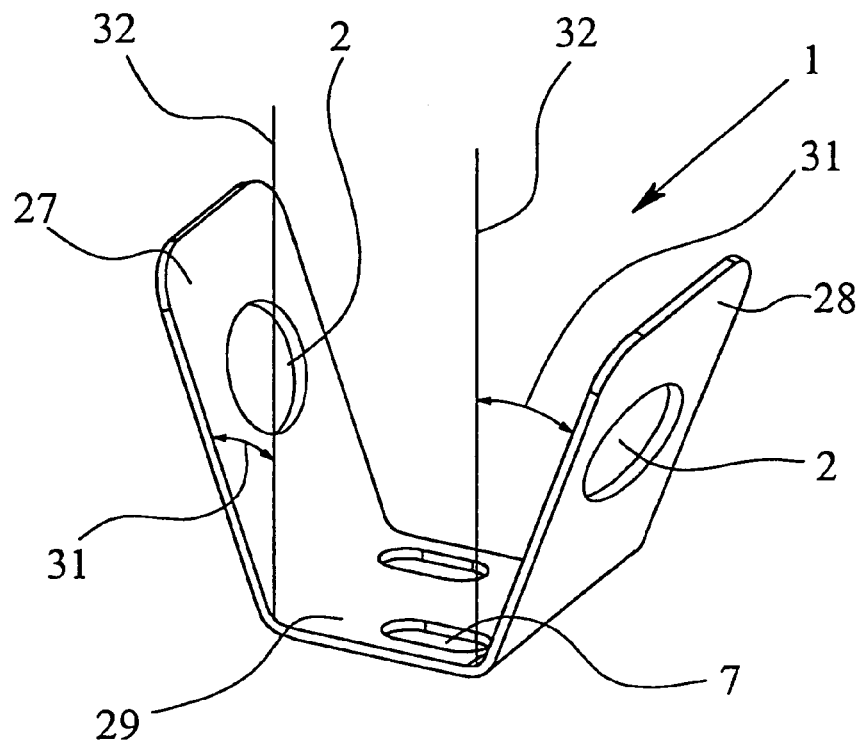
FIGS. 14a and 14b show a first variation of the mounting device according to the third embodiment of the invention, that is, FIG. 14a being without a sensor and FIG. 14b being with a clamped sensor.
Figure 14B:
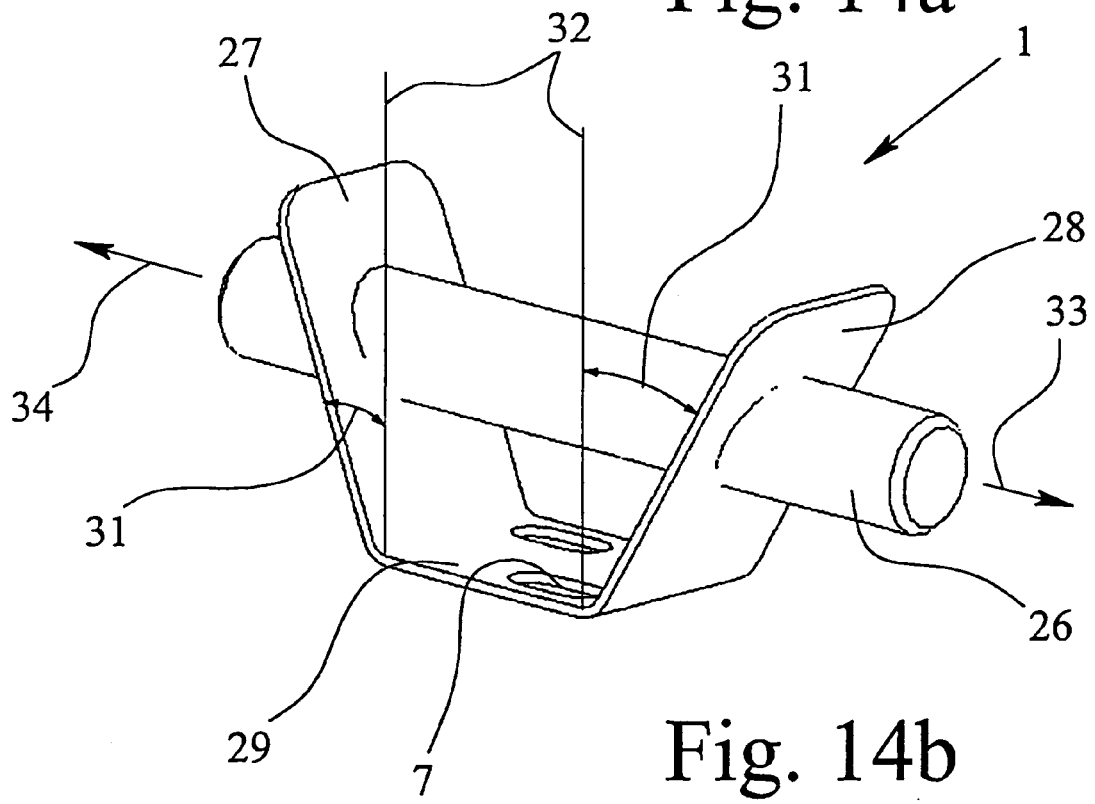
Figure 15:
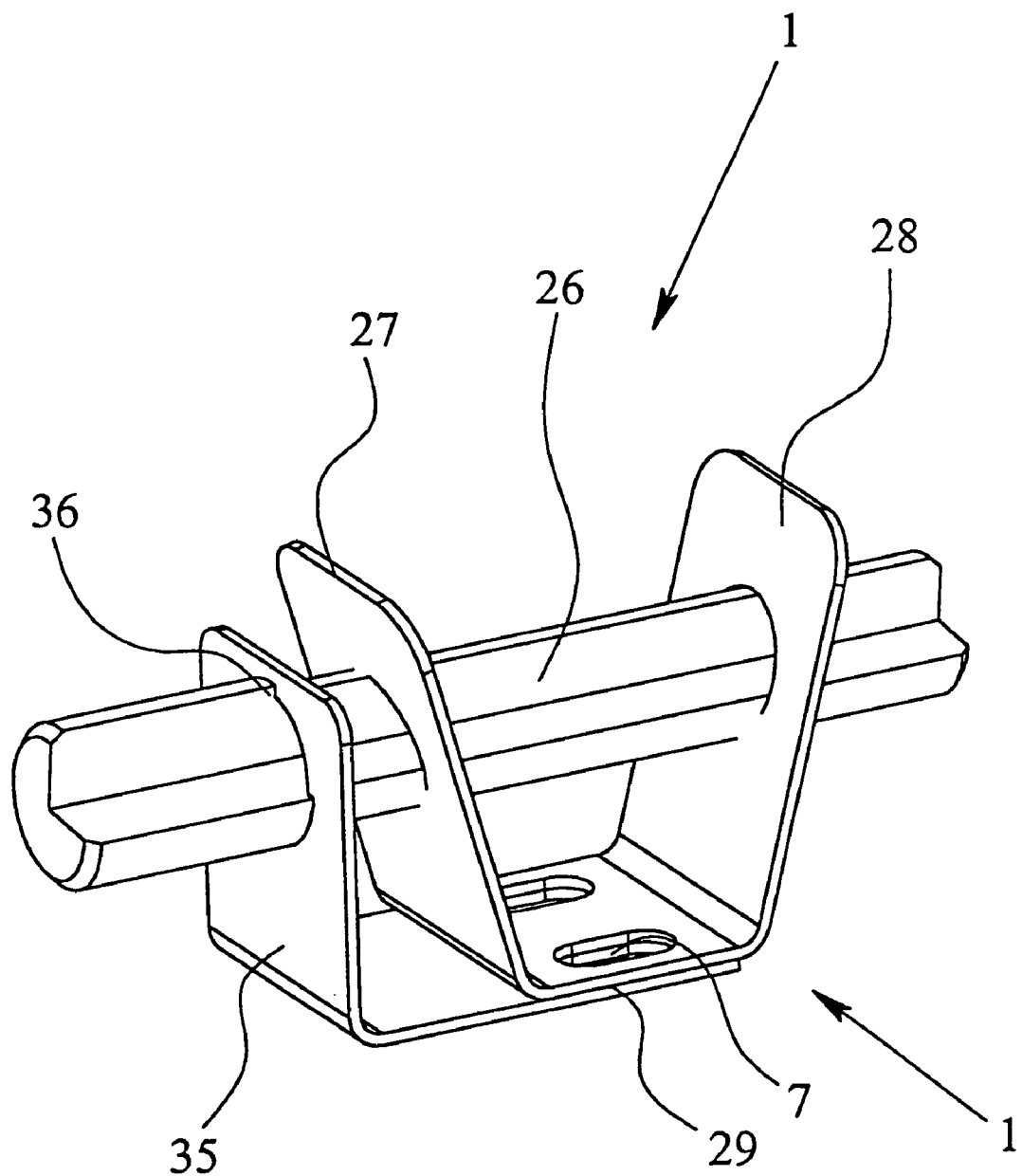
FIG. 15 shows a variation of the mounting device shown in FIG. 14b, FIGS. 16a & 16b show a second variation of the mounting device according to the third embodiment of the invention, FIG. 16a being without a sensor and FIG. 16b being with a clamped sensor.
Figure 16A:
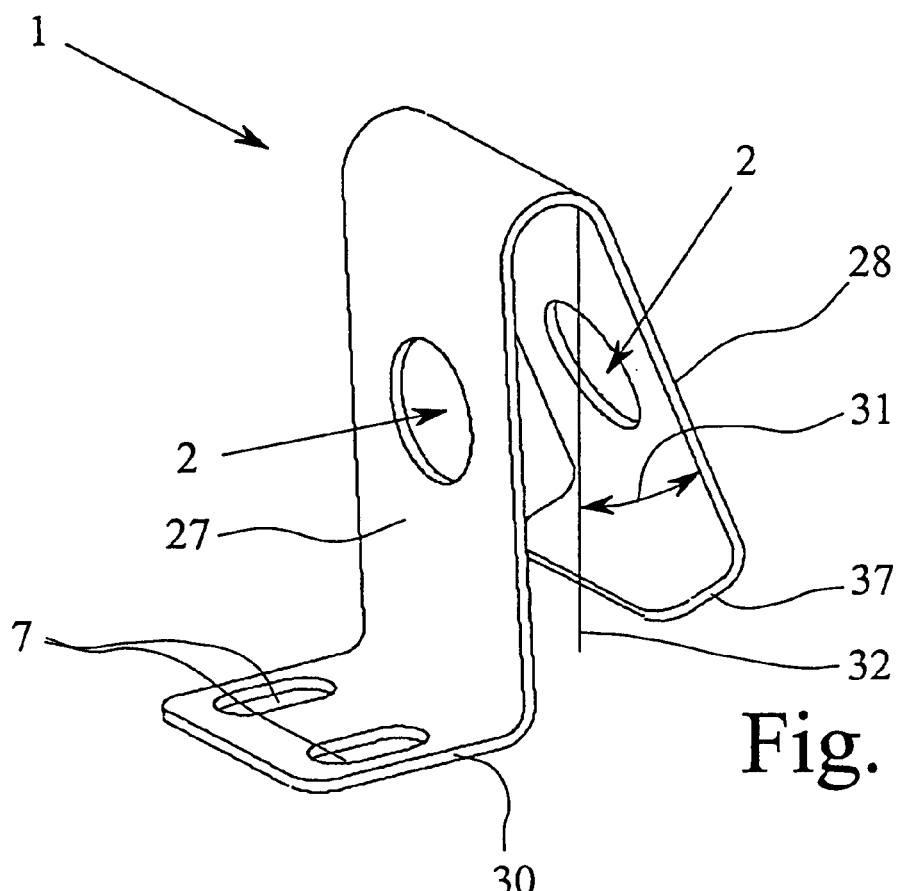
Figure 16B:
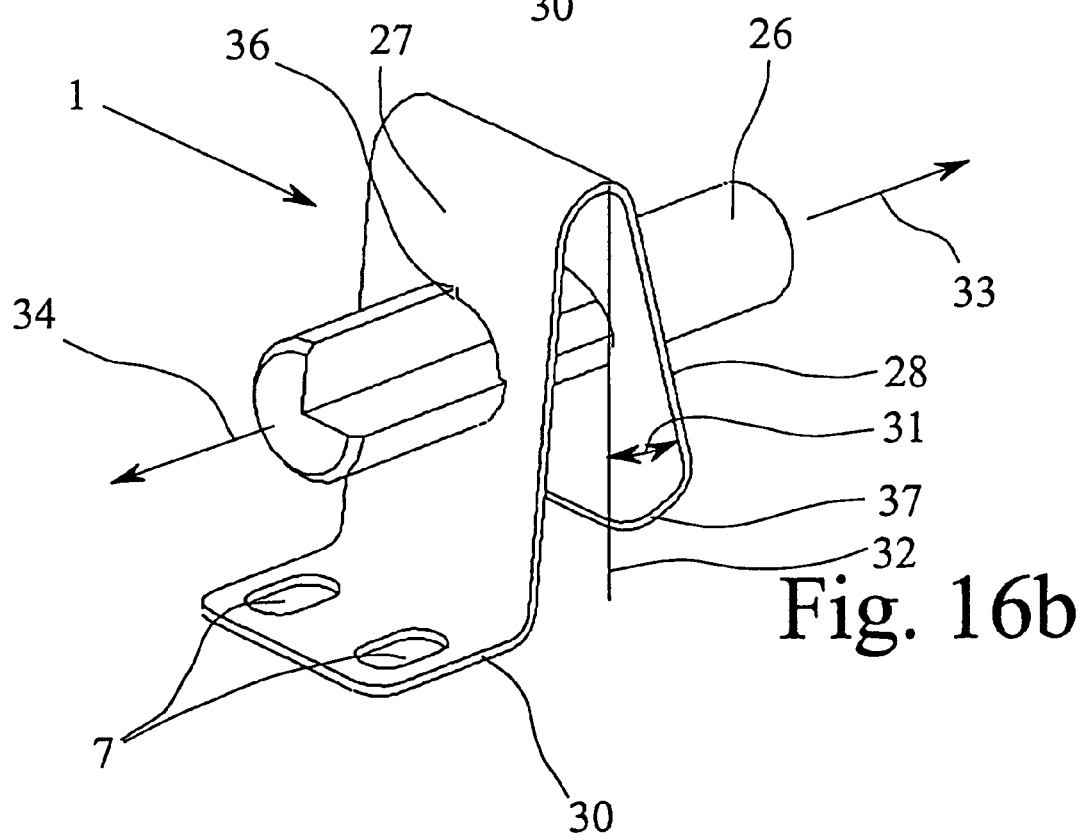
Figure 17:
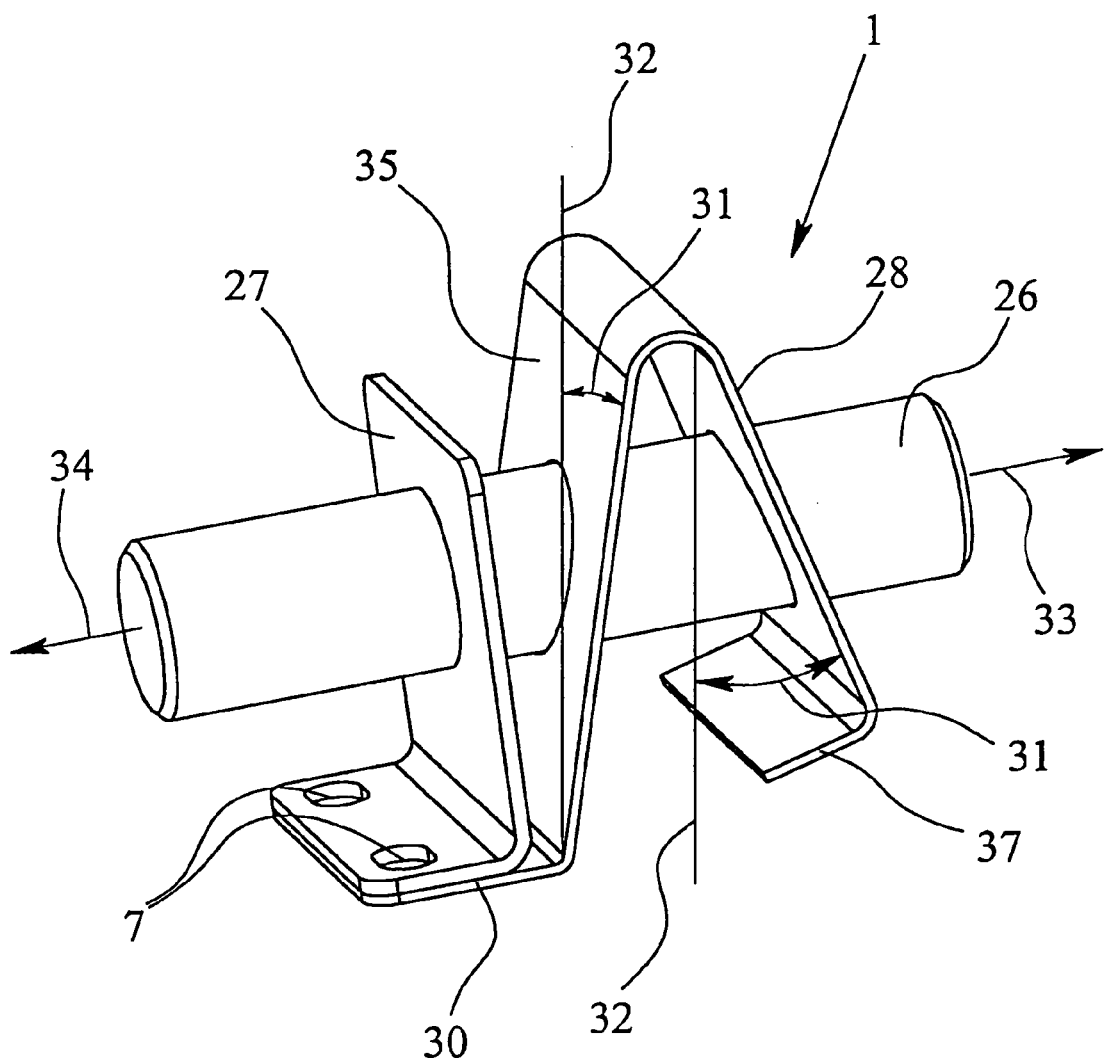
FIG. 17 shows one variation of the mounting device according to the embodiment as shown in FIG. 16b.

The mounting devices 1 have two legs 27, 28 which are elastically connected to one another and which are connected to one another via a spine 29 in the versions as shown in FIGS. 14*a*, 14*b* and 15 and are connected to one another directly in the versions as shown in FIGS. 16*a*, 16*b* and 17. A recess 2 is formed in the two legs 27, 28 for holding the proximity switch 26 with the proximity switch 26, as shown in FIGS. 14*b* and 16*b*, penetrating the two recesses 2 in the lengthwise direction. While the mounting device 1, as shown in FIG. 14*a*, is made in roughly a U-shape as a result of the spine 29, the mounting device 1 as shown in FIG. 16*a* is made in roughly a V-shape. The mounting device 1 is fixed on the housing or container wall in the embodiments shown in FIGS. 14*a*, 14*b* and 15 using screws which can be inserted through holes 7 made in the spine 29. For the mounting device 1 as shown in FIGS. 16*a*, 16*b* and 17 the mounting device 1 is fixed using a mounting leg 30 which is fabricated at roughly a right angle on the end of the leg 27. Fixing then takes place again by means of screws which can be inserted into the corresponding holes 7 in the mounting leg 30.

In order to insert the proximity switch 26 into the mounting device 1 or remove it from the mounting device 1, the two legs 27, 28 must be compressed against their spring force such that they are aligned essentially parallel to one another. Conversely, clamping of the proximity switch 26 into the mounting device 1 or recesses 2 takes place by the spring legs 27, 28 as a result of the spring force of the mounting device 1 springing back out of their forced parallel position into the position in which the legs 27, 28 are aligned at an acute angle to one another. The proximity switch 26 is fixed in the mounting device 1 thus by the combination of the spring action of the legs 27, 31 and the adjustment angle 31 of the legs 27, 28, where the adjustment angle 31 is measured to the vertical 32. The adjustment angle 31 is generally between 10° and 30°, preferably roughly 15°, so that the angle between the two legs 27, 28 is between 20° and 60°, preferably roughly 30°.

In the mounting device 1 as shown in FIGS. 14a and 14b, the two legs are in the initial state of the mounting device 1 (FIG. 14b) in which the proximity switch 26 is held so that an adjustment angle 31 of roughly 15° to the vertical 32 is formed by the two legs 27, 28, which are essentially in mirror image to one another, i.e., the two legs 27, 28 are deflected in the opposite directions of rotation to the vertical 32 for mounting the proximity switch 26. In this way, the forces in the two lengthwise directions 33, 34 of the proximity switch 26 can be accommodated by the mounting device 1 so that the proximity switch 26 is securely held by the mounting device 1 regardless of the lengthwise direction 33, 34 from which the forces are applied to the proximity switch 26.

In contrast, in the mounting device 1 as shown in FIGS. 16a and 16b, only the legs 28 are bent at an adjustment angle 31 to the vertical 32. This results in that proximity switch 26 can accommodate larger forces only in the lengthwise direction 33, while the proximity switch 26, when forces are exerted in the lengthwise direction 34, can be pulled out of the mounting device 1.

So that in a mounting device 1 which does not have a spine 29 for connecting the two legs 27, 28, forces can be accommodated in the two lengthwise directions 33, 34, according to FIG. 17 in which a third leg 35 is shown. Third leg 35 is aligned at the adjustment angle 31 to the vertical 32 so that forces in the lengthwise direction 34 can be accommodated by the recess which is made in the leg 35.

A third leg 35 can also be formed in the U-shaped mounting device 1 as shown in FIG. 15, where the third leg 35 is used to define the positioning of the proximity switch 26 in the mounting device 1. To do this, the third leg 35 is aligned perpendicular to the lengthwise axis of the proximity switch 26 and the proximity switch 26 has a stop edge 36 which is pulled by the spring force of the leg 28 against the third leg 35. This defined positioning of the proximity switch 26 is also achieved in the mounting device 1 as shown in FIG. 16b, here the stop edge 36 of the proximity switch 26 being pulled by the spring force of the leg 28 against the leg 27.

Each of FIGS. 16a, 16b and 17 show an edge 37 bent essentially at a right angle on the leg 28 which acts against the leg 27 as protection against overextension when the leg 28 is compressed. In this way damage of the mounting device 1 is prevented.

Figure 18:
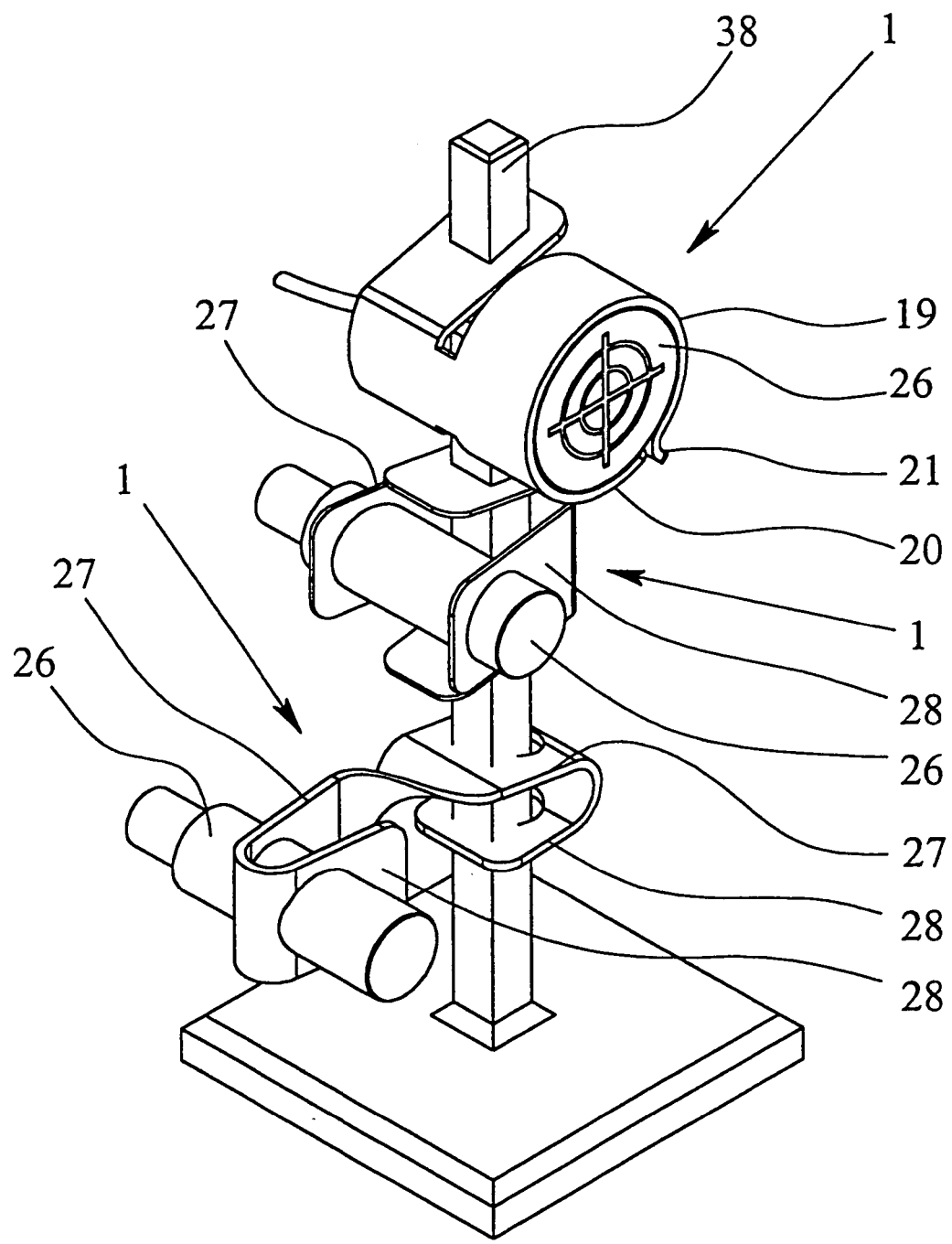
FIG. 18 shows an arrangement of several mounting devices according to the invention.

Finally, FIG. 18 shows the arrangement of several proximity switches 26 using different mounting devices 1 on a bar 38. The mounting devices 1 are used both to fix the proximity switch 26 in the mounting device 1 and also to fix the mounting device 1 on the bar 38. In the mounting device 1 shown at the top in FIG. 18, the second embodiment of the invention is used to fix the proximity switch 26; while to fix the mounting device 1 on the bar 38, the third embodiment of the invention is used. FIG. 18 also shows that the mounting device 1 can be used not only for cylindrical proximity switches 26, but also for cuboidal proximity switches when the recesses 2 are made rectangular, as in FIG. 18 for fixing on the bar 38.

The mounting device 1 of the invention can be produced from metal or plastic. Preferably, the mounting device 1 is composed of steel, particularly high quality steel, or a lightweight metal, particularly aluminum or an aluminum alloy. In this way, a mounting device 1 can be made which is very durable and thus can used under severe ambient conditions. The mounting device 1 can be very easily and economically formed by rolling from steel strip and/or by bending with the corresponding shaping tools. In addition, several casting methods are possible for producing the mounting device 1 of the invention, for example die-casting or continuous casting.

Overall there are a host of possible embodiments of the mounting device 1 of the invention which go beyond the embodiments shown. The respective mounting device 1 can thus be optimally adapted in its external configuration depending on the application. The proximity switch can always be quickly and easily fixed in the mounting device 1, and a uniform clamping force is ensured by the corresponding choice of the material and the stress on the mounting device 1 when the recess 2 is spread within its elastic range.

What is claimed is:

1. An arrangement of a mount device with a sensor comprising,
    at least two legs elastically connected to one another and each of which has a closed cylindrical recess formed therein for holding the sensor enclosed within the recess of each of the legs,
    wherein the legs are displaceable from a first state into a second state against the elastic connection of the at least two legs, the sensor being removably held in the mounting device hy the legs, the legs being aligned at an acute angle relative to each other, and in the second state, the sensor being insertable into and removable from the mounting device, the legs being aligned relative to one another at an angle smaller than the acute angle; and
    wherein a mounting leg is connected to at least one of the legs and has a plurality of holes for fixing of the mounting device to the wall of a vessel or housing.

2. Arrangement as claimed in claim 1, wherein the mounting leg is a spine between the two legs, said spine connecting the legs so that the mounting device is approximately U-shaped.

3. Arrangement as claimed in claim 1, wherein the mounting device is approximately V-shaped and one leg transitions to a mounting leg angled at about 90° from the one leg.

4. Arrangement as claimed in claim 3, further including at least a third leg, wherein the at least two legs have an angle of 10° to 30° relative to a vertical plane and the at least two legs, when in the second state, are deflected front different sides of the vertical plane.

5. Arrangement as claimed in claim 1, wherein, in the second state, the at least two legs are parallel.

* * * * *